June 10, 1958 D. EKLOV 2,838,609

ELECTRIC COMMUNICATION SYSTEM

Filed Nov. 21, 1955

INVENTOR
DAVID EKLÖV

BY Strauch, Nolan & Neale

ATTORNEYS

United States Patent Office 2,838,609

Patented June 10, 1958

2,838,609

ELECTRIC COMMUNICATION SYSTEM

David Eklov, Alvsjo, Sweden, assignor to Svenska Relafabriken AB, Stockholm, Sweden, a joint-stock company of Sweden Application November 21, 1955, Serial No. 548,168

Claims priority, application Sweden November 29, 1954

4 Claims. (Cl. 179—1)

Figures 1, 2:
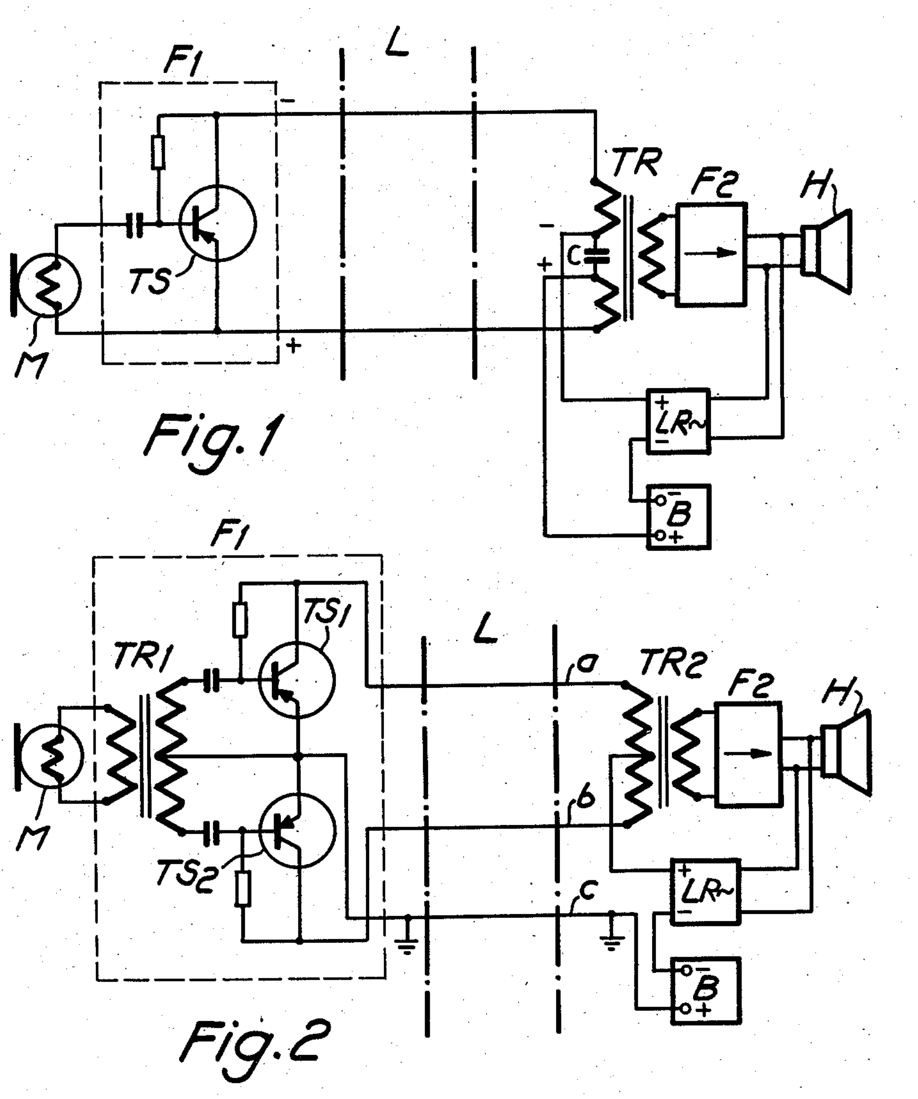

The present invention relates to electric communication systems and more particularly to systems for the transmission of signals over a line to a signal receiver from a signal transmitter of the kind which is supplied with a direct current and which during the signal transmission varies the direct current for the generation of alternating voltage signals, the magnitude of the signal voltages being dependent on the intensity of the supplied direct current, and the direct current being supplied to the signal transmitter over the said line.

Examples of signal transmitters of the kind mentioned above are microphones of the carbon type and transistors which, as is well known, possess the property that a decrease of the direct current through them results in a decrease of the direct current variations which correspond to an incoming acoustic or control signal and which give rise to the outgoing alternating voltage signals which may be superimposed on the supplied direct current.

It is the object of the present invention to provide a communication system in which this response of the signal transmitter to the incoming supplied direct current is utilized to accomplish an automatic regulation of the strength of the received signal voltages. Thus the system can be so designed that the received signal voltages are automatically adjusted to an amplitude value between two predetermined limits independent of considerable variations in the impedance or attenuation of the transmission line and/or the strength of the incoming signals. According to the invention this automatic regulation effect is obtained by providing a device for controlling the intensity of the direct current supplied over the line to the signal transmitter, the said controlling action being dependent on the magnitude of the signal voltages.

Although the invention may be utilized for many purposes and for the transmission of many different kinds of messages and signals, the invention is especially suitable for use in public address systems and intercommunication systems having loudspeaker. In such systems there are often a plurality of transmitting stations and also a plurality of separate receiving stations, the various transmitting stations being connectable to a receiving station or several receiving stations by means of switching devices, and then the different connecting lines often have highly different attentuation. An important advantage obtained by the present invention is that the transmitting stations do not need individual power sources and that separate power supply lines need not be connected to the stations.

The invention will be described more in particular in conjunction with the accompanying drawing on which Figures 1 and 2 show two embodiments of the invention.

In Figure 1 M designates a microphone which is assumed to be of the dynamic type, and thus microphone M does not in itself possess the property of delivering output voltages which are dependent of the intensity of the line current. The transmitting member having this characteristic instead consists of a transistor TS which is connected in known manner between the two conductors of line L and is included in a transistor amplifier F1 the input of which is connected to a microphone M for the amplification of the microphone output voltages. Thus in this case transistor TS constitutes the signal transmitter.

The signal receiver comprises a receiver amplifier F2 the input of which is connected to line L over a transformer TR and the output of which is connected to a loudspeaker H.

On the line side the transformer TR is divided in two halves, each being connected to one terminal of a current source for supplying direct current to the signal transmitter over line L, the current source being schematically shown as consisting of a battery B and a rectifier LR the direct current side of which is connected in series with battery B in such manner that the output voltages of the rectifier and that of the battery oppose each other. It is of course assumed that rectifier LR is provided with a load resistance or designed in some other manner, so that it does not block the current delivered by battery B otherwise than by opposing voltages produced in the rectifier. The alternating current side of rectifier LR is connected to the output of the receiver amplifier F2 so that it produces a direct voltage corresponding to the alternating current signals applied to the loudspeaker H.

In Figure 1 there is further shown a capacitor C which serves as an alternating current coupling between those terminals of the two halves of transformer TR to which the direct current is applied.

As will be obvious from the drawing an increase of the amplitude of the received signal voltages will cause an increase of the opposing voltage delivered by rectifier LR to the circuit for feeding the transistor TS, and correspondingly a reduction of the amplitude of the signal voltages will cause a reduction of the said opposing voltage. Assuming that for any amplitude of the received signal voltages the voltage of battery B is higher than the opposing voltage produced by rectifier LR, an increase of the amplitude of the received signal voltages will always cause a reduction of the line current and in consequence thereof a reduction of the amplitude of the signals delivered from transistor TS. In analogous manner reduction of the amplitude of the received signals will cause an increase of the amplitude of the signals transmitted from the transistor, and in this manner the strength of the received signal can be maintained within comparatively narrow limits independent of variations in the line attenuation.

A system controlled according to the principle described above thus works with a compression characteristic within the whole control range. However, it is also possible to make a control characteristic have expansion nature as long as the received signal strength is below a certain value, and to make the control compressive when the signal strength exceeds this value so that a limitation of the signal strength is then obtained. In the schematically shown embodiment this can be brought about by designing the rectifier LR so that its output direct voltage coacts with the voltage of battery B at low values of the incoming alternating voltage but decreases when the incoming alternating voltage increases, and goes through zero to counteract the voltage of battery B at higher values of the incoming alternating voltage. The design of a rectifying device for this purpose is well known in the art. It can for instance comprise two rectifying paths acting in opposite directions which are made effective alternately at high and low alternating voltages.

In practice it may be advantageous to make the current source B and the rectifier LR as a single unit consisting for instance of a rectifier being connected to an A. C. power source and provided with regulation means, in which case the desired relation between the output D. C. current and the amplitude of the incoming signals is obtained directly by regulating the rectifier with the incoming signal voltage as control quantity. Thus the rectifier can consist of triodes arranged to form a grid controlled diode rectifier circuit, a transductor controlled dry rectifier or the like with suitable filtering devices which may also be designed to introduce the necessary time constants for the control action. In a manner known per se a control action causing a reduction of the direct current supplied to the line should take place slower than a control action causing an increase of the direct current. This can be accomplished by taking out the control voltage over a capacitor which is caused to discharge by means of a rectifier circuit when the applied voltage is reduced, the discharge taking place through a circuit which has a higher resistance than the circuit through which the capacitor is charged. Furthermore it is possible to derive the controlled direct voltage from a separate amplifier which may be connected to the line or to some other place than the output side of the received amplifier F2.

In the shown embodiment with a two-wire line connection changes in the line current intensity will be transferred by transformer TR to the receiver amplifier F2 and loudspeaker H, and in order to prevent strong clicks in the case of rapid control actions or interference in the line current a voltage limiter is preferably inserted e. g. in the receiver amplifier F2, the said limiter limiting the amplitude of the received signals to a value somewhat higher than the maximum value in steady state. The voltage limiter may also be connected to the circuit for rectifying the control alternating voltage, so that the control action to the highest possible extent counteracts too rapid noise-producing increases of the line current.

The amplifier F1 in the transmitting station can, of course, consist of two or more transistors connected in cascade in known manner, the first transistor acting e. g. as voltage amplifier and the last transistor working as a cascade connected current amplifier.

In Figure 2 a modified embodiment is shown which is designed so that disturbances caused by changes in the line current due to control actions will be eliminated to the highest possible extent. The amplifier F1 in the transmitting station here comprises push-pull connected transistors TS1 and TS2, and an input transformer TR1 having a centre tap on the secondary side is connected in known manner to these transistors. In the receiving station there is provided a transformer TR2 with centre-tapped primary winding, and the direct current feed to amplifier F1 is here effected by means of a separate conductor *c* included in line L, the conductor *c* being connected in series with the current supply source between the centre point of the push-pull connected transistors TS1 and TS2 and the centre tap on transformer TR2 so that conductors *a* and *b* in line L convey the direct current in parallel connection while they convey the signals in ordinary manner in series connection. Since the two halves of the primary winding of transformer TR2 counteract each other with respect to the direct current ampere turns, transformer TR2 will not be magnetised by the supply direct current and therefore it will not convey noise signals produced due to changes in the direct current intensity during the control action.

The modifications described in conjunction with Figure 1 as regards the control characteristic and the design of the current source and the control means are, of course, also applicable to the embodiment shown in Figure 2.

I claim:

1. An electric communication system comprising at least one transmitting station, a receiving station separate from the transmitting station, a line interconnecting the transmitting and the receiving station, a direct current source at the receiving station for supplying direct current to the transmitting station over said line, means at the transmitting station for modulating said direct current, thereby giving rise to an alternating component in said current, and means at the receiving station responsive to the magnitude of said alternating component as received at the receiving station for controlling the intensity of said direct current.

2. An electric communication system comprising a transmitting station, a receiving station separate from the transmitting station, a line interconnecting the transmitting and the receiving station, a direct current source at the receiving station for supplying direct current to the transmitting station over said line, means at the transmitting station for modulating said direct current to give rise to an alternating component in said current, means at the receiving station for deriving a control voltage from said alternating component, and means at the receiving station for applying said control voltage to control the output voltage of said direct current source.

3. An electric communication system comprising a transmitting station, a receiving station separate from the transmitting station, a line interconnecting the transmitting and the receiving station, a direct current source at the receiving station for supplying direct current to the transmitting station over said line, means at the transmitting station for modulating said direct current to give rise to an alternating component in said current, means at the receiving station for rectifying part of the energy of said alternating component to produce a D. C. voltage, and means for applying said D. C. voltage in series with the output voltage of said direct current source to said line.

4. An electric communication system comprising a transmitting station, a receiving station separate from the transmitting station, a line interconnecting the transmitting station and the receiving station, a direct current source at the receiving station for supplying direct current to the transmitting station over said line, means at the transmitting station for modulating said direct current to give rise to an alternating component in said current, means at the receiving station for deriving from said alternating component a control voltage varying in accordance with the amplitude of said alternating component, and control means associated with said direct current source and responsive to said control voltage to decrease the intensity of said direct current with increasing amplitude of said alternating component and to increase the intensity of said direct current with decreasing amplitude of said alternating component.

References Cited in the file of this patent

UNITED STATES PATENTS

| | | |
|---|---|---|
| 2,451,021 | Detuno | Oct. 12, 1948 |
| 2,501,327 | Good | Mar. 21, 1950 |
| 2,558,002 | Ross | June 26, 1951 |